United States Patent [19]

Gelula

[11] Patent Number: 4,578,844
[45] Date of Patent: Apr. 1, 1986

[54] COUPLING SYSTEM

[76] Inventor: Jerome D. Gelula, 535 E. 86th St., New York, N.Y. 10028

[21] Appl. No.: 640,071

[22] Filed: Aug. 13, 1984

[51] Int. Cl.$^4$ .............................................. A44B 17/00
[52] U.S. Cl. ........................................ 24/631; 24/632; 24/645; 24/648
[58] Field of Search ................. 24/645, 631, 632, 634, 24/635, 648, 115 G, 132 WL, 134 KB; 292/341.17

[56] References Cited

U.S. PATENT DOCUMENTS

| | | | |
|---|---|---|---|
| 2,153,077 | 4/1939 | Clarke | 24/645 |
| 2,248,005 | 7/1941 | Lyman | 24/645 |
| 2,970,796 | 2/1961 | Ross | 24/632 |
| 3,090,092 | 5/1963 | Szemplak et al. | 24/648 |
| 3,146,846 | 9/1964 | Gutshall | 24/645 |
| 3,196,824 | 7/1965 | Howard | 24/632 |
| 3,311,188 | 3/1967 | Gutshall | 24/603 |
| 3,564,672 | 2/1971 | McIntyre | 24/632 |
| 3,631,571 | 1/1972 | Stoffel | 24/645 |
| 3,713,192 | 1/1973 | Wallin | 24/645 |
| 4,361,939 | 12/1982 | Gelula et al. | 24/631 |

FOREIGN PATENT DOCUMENTS

| | | | |
|---|---|---|---|
| 552420 | 1/1958 | Canada | 24/645 |

Primary Examiner—Victor N. Sakran
Attorney, Agent, or Firm—Paul J. Sutton

[57] ABSTRACT

The present invention discloses a unique, self-aligning, quick-releasing coupling system capable of releasably joining male/female items for permanent or temporary joining. One or preferably two jaw members are supported for movement between capturing and releasing positions on a support structure on a pair of cylindrical pivots connected to the structure. Tension springs carried by the capturing members and interrelated with the support structure biases the capturing members to the releasing position. A locking member including a shaft with a pair of pins capable of being rotated via the shaft in and out of a pair of recesses in the jaw members from releasing mode either respectively locks the jaw members into the capturing mode or unlocks from the jaw members in the releasing mode. The shaft is operated by a lever connected to a brass plate by an expansion spring which biases the pins via the shaft towards the locking mode. The jaw members are relased by rotating the lever and shaft to draw the pins from the jaw members, which then are biased open by the tension springs. The jaw members are rotated into capturing position by insertion of the member desired to be captured until the pins are biased into the jaw member recesses so as to lock the jaw members in the capturing position.

5 Claims, 7 Drawing Figures

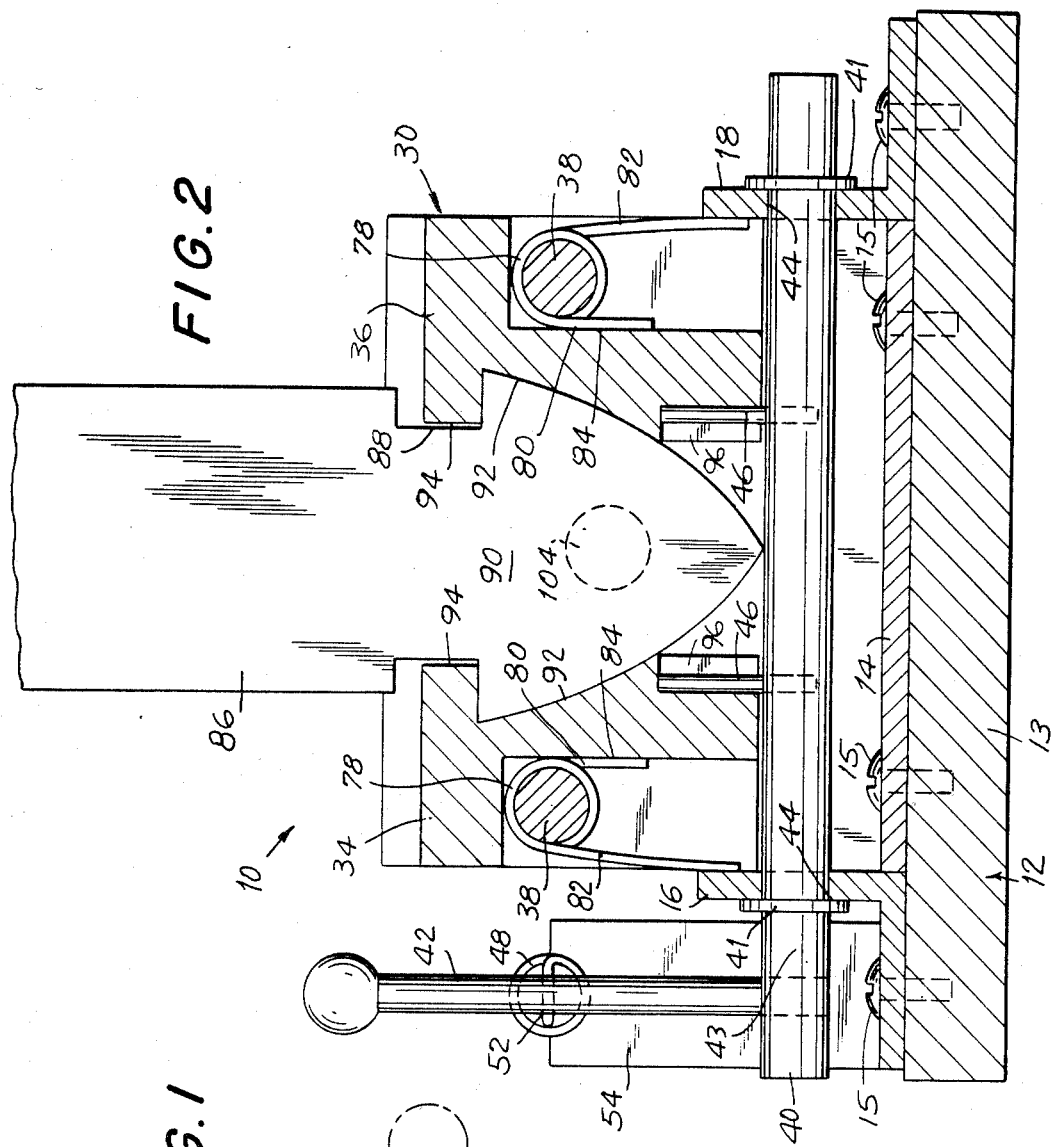
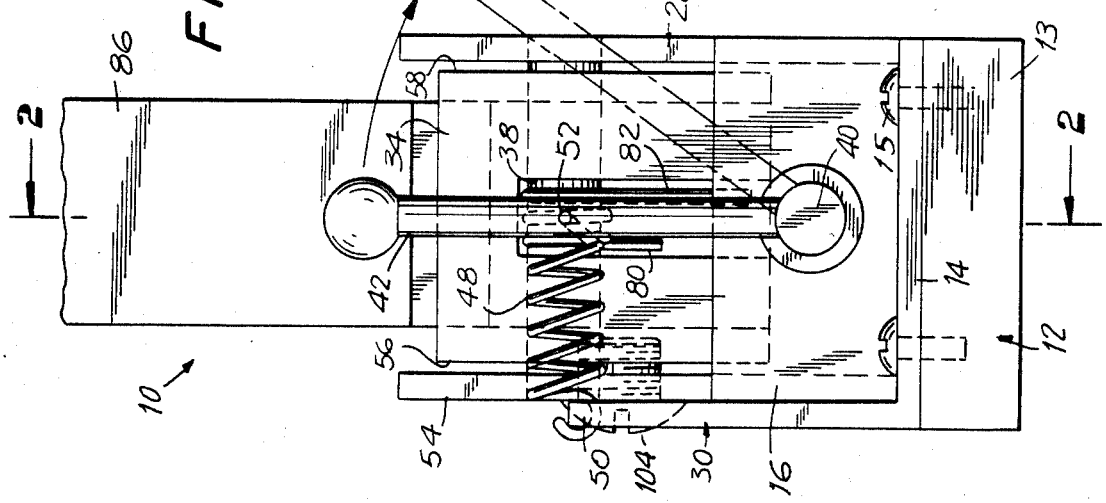

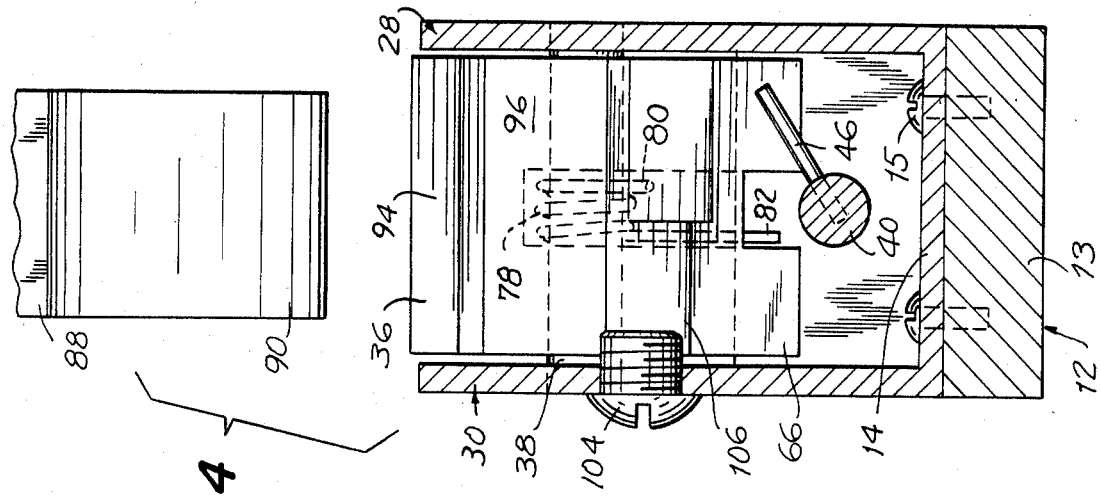
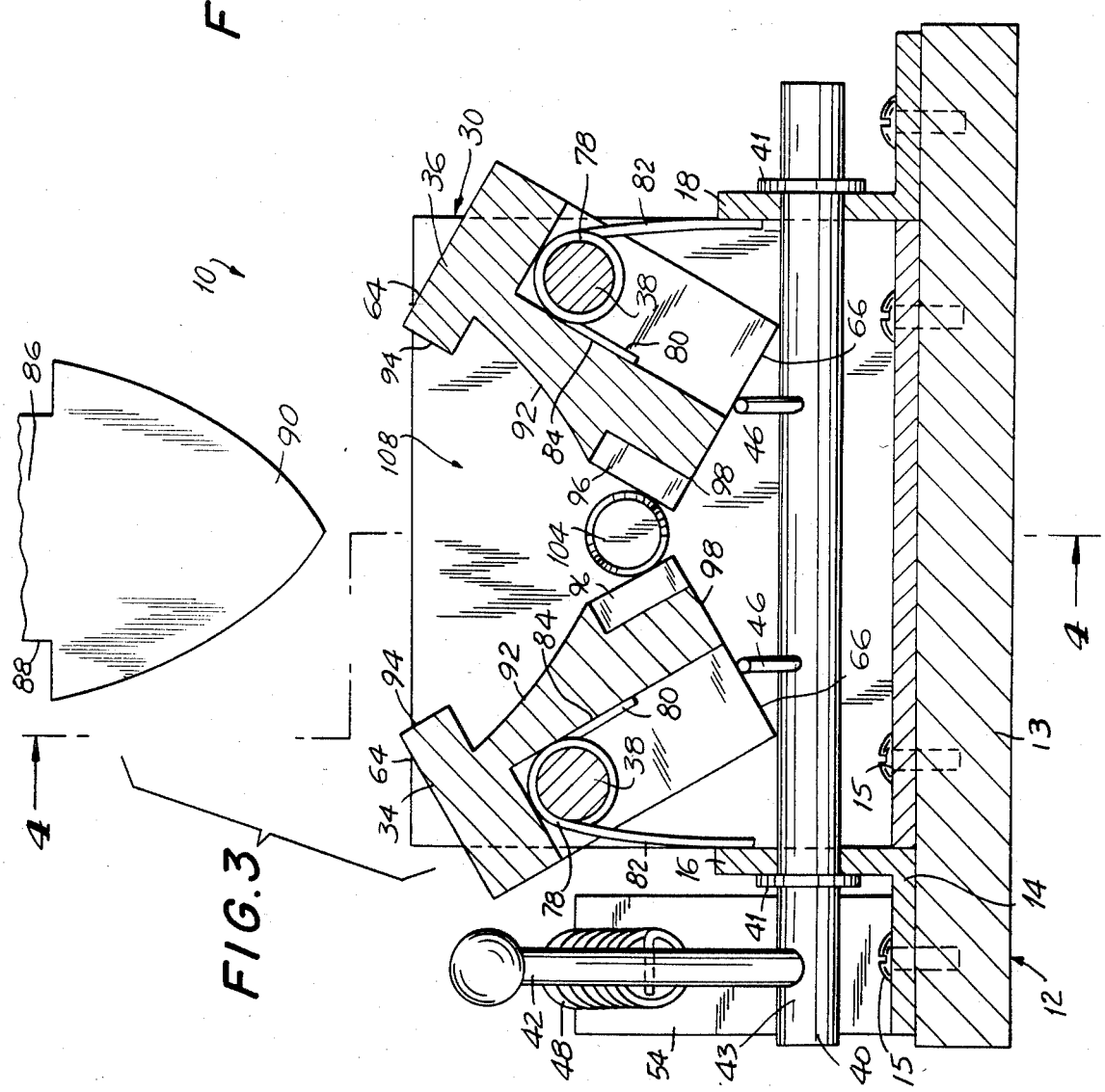

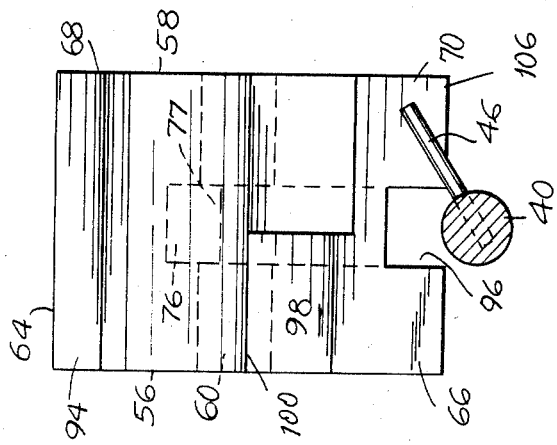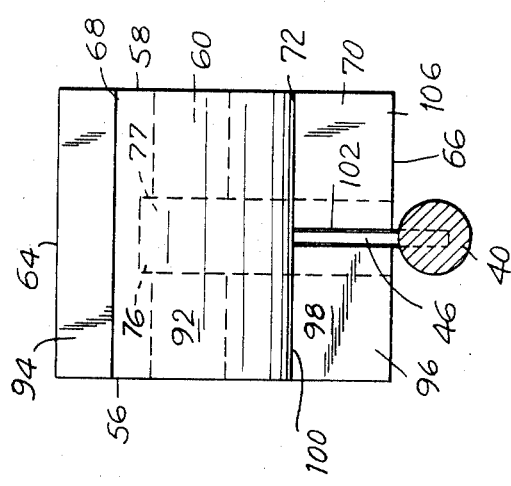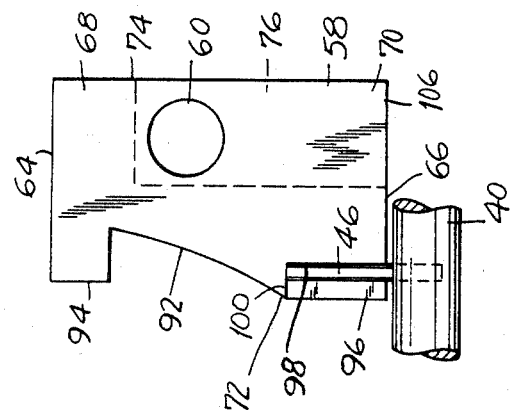

2

4,578,844

COUPLING SYSTEM

The present invention relates generally to couplings and more specifically to a latching system capable of use in any number of distinct and related environments.

Latching systems are numerous but as many systems as there are most of them are directed to specific applications and are not directed to general use. Still, universal type latches are known in the art. Nevertheless, any advance in simplicity, ease of manufacture and assembly, and flexibility in general uses has interest, for the possible application is very wide.

My prior latching invention, namely U.S. Pat. No. 4,361,939, teaches the use of a self-aligning, quick-release coupling system capable of joining any two or more of a great variety of male/female mating items to be temporarily or permanently joined. Certain aspects of my invention, however, could be improved on. For example, the tongue must be aligned directly with male/female alignment, which limits the invention in certain applications.

This application and specification is means for many possible applications with the view toward separately protecting many of the unique features of the present application.

It is, therefore, an object of the present invention to provide a coupling system that exhibits automatic and positive latching.

Another object of the present invention is to provide a latching system which is fail-safe, even in the undesirable event distortion of one or more compents occurs.

Yet another object of the present invention is to provide a coupling system where the female members when in the capturing position and holding the male member can be positively released at an operational position distant from the male/female joining position.

Yet another object of the present invention is to provide a coupling system where the male and female members to be releasably joined are self-aligning at all times and at all points in their cooperative interaction.

A further object of this invention is to provide a novel coupling or latching system which accomplishes the objects herein set forth in a lightweight, inexpensive structure capable of being operated in a repeated and reliable manner.

Still a further object is to provide a latching system capable of being utilized by a person using one hand.

Another object is to provide the aforementioned system where activation of both engagement and disengagement may be accomplished by remote means.

A further object is to provide a latching system having female members that can be adopted to receive and lock unto male members having a wide variety of configurations.

The foregoing objects and features of the present invention will become more apparent from a reading of the following technical specification wherein similar reference characters are used in conjunction with the several views of the accompanying drawings, wherein similar reference characters denote similar elements throughout the several views, and in which;

FIG. 1 is a side view of the present invention in the capturing mode;

FIG. 2 is a sectional view taken through line 2—2 of FIG. 1;

FIG. 3 is a sectional end view of the invention in the releasing mode;

FIG. 4 is a sectional view taken through line 4—4 of FIG. 3;

FIG. 5 is an isolated side view of one of the capturing jaws;

FIG. 6 is a front view of one of the capturing jaws in the capturing position with the pin in the locked position; and FIG. 7 is a front view of the capturing jaws shown in FIG. 6 in the releasing mode and the pin in the unlocked position.

Reference is now made in detail to drawings.

A latching system 10 is shown in a capturing mode in FIGS. 1 and 2 and in a releasing mode in FIGS. 3 and 4. Discussion here will begin with the capturing mode.

A support structure 12 includes a base 13 and a flat bottom plate 14 connected to base 12 by screws 15. A pair of spaced, parallel, opposed end plates 16 and 18 are connected to bottom plate 14, end plates 16 and 18 being substantially perpendicular to bottom plate 14. A pair of opposed side plates 28 and 30 are connected to base plate 14 between end plates 16 and 18 and are connected to and extend perpendicularly from bottom plate 14. The material of the embodiment being described here is steel for the bottom plate, the end plates, and the side plates; and the base here can be of wood or metal.

A pair of mating, facing capturing members, or jaw members, 34 and 36 are pivotably mounted to side plates 28 and 30 by parallel cylindrical pivots 38 equidistanced from base 14 and aligned perpendicularly to and connected to side plates 28 and 30. A cylindrical shaft 40 is positioned under jaw members 34 and 36 and aligned perpendicularly to the axial direction of parallel pivots 38 midway between and parallel to side plates 28 and 30. Shaft 40 is rotatably supported at apertures 44 formed midway in end plates 16 and 18 and through which shaft 40 extends. Shaft 40 is spaced from both jaw members 34 and 36 and bottom plate 14, to which it is parallel. A lever 42 extends radially from shaft 40 at the end of a shaft portion 43 laterally spaced from jaw 34 and end plate 16. Lever 42 allows an operator to rotate the shaft. A pair of locking washers 41 are positioned in annular grooves formed in shaft 40 adjacent to the outer surfaces of end plates 16 and 18 relative to jaw members 34 and 36 so as to prevent longitudinal, or axial, movement of shaft 40 in apertures 46. A pair of pins 46 are radially connected to and extend from shaft 40. In the capturing mode as shown in FIGS. 1 and 2, pins 46 extend from shaft 40 midway between side plates 28 and 30 and are generally upright relative to bottom plate 14. Lever 42 is also upright as shown in FIGS. 1 and 2, preferably parallel to pins 46. As indicated in FIG. 1, an expansion spring 48 is connected at one end 50 to the mid portion of shaft 40 and at the other end 52 to an upright brace member 54 secured to and extending perpendicularly from bottom plate 14 and parallel to side plate 28 and proximate to lever 42. Here it is noted that lever 42 can extend any desired distance from end plate 16 and brace member 54 will be positioned at the same distance from end plate 16. Expansion spring 48 in the capturing mode being discussed is unbiased and lever 14 has been returned to the upright position described and as shown in FIGS. 1 and 2 so that shaft 40 is not being rotatably biased. In this unbiased position, pins 46 are also unbiased and parallel to side plates 28 and 30 and perpendicular to the axial directions of pivots 38.

Jaw members 34 and 36 include opposed parallel side walls 56 and 58 with side walls 56 being disposed on the far side of shaft 40 relative to brace member 54 for both jaw members 34 and 36, and side walls 58 being disposed on the near side of shaft 40 relative to brace member 54 for both jaw members 34 and 36. Side walls 56 and 58 are parallel to and spaced proximate to side plates 28 and 29, respectively, which are in turn disposed on the far and near sides, respectively, of shaft 40 relative to brace member 54.

Bores 60 formed transversely through jaw members 34 and 36 receive cylindrical pivots 38. Bores 60 are spaced between opposed top and bottom walls 64 and 66. Bottom walls 66, which are perpendicular to side walls 56 and 58, are spaced from shaft 40 which in turn is spaced from shaft 40. Top portions 68 and bottom portions 70 of jaw members 34 and 36, respectively, are located on opposing upper and lower sides of bores 60. Mating front walls 72 of jaw members 34 and 36 confront one another and have opposed rear walls 74 that are substantially parallel to one another in the capturing mode as shown in the peferred embodiment in FIG. 2.

Slots 76 are formed in jaw members 34 and 36 substantially perpendicular to bores 60 and opening onto rear walls 74. Slots 76 and bores 60 intersect to form coextensive volumes 77.

A pair of tension springs 78 are positioned in slots 76 and have annular mounting portions 79 positioned around cylindrical pivots 38 at coextensive volumes 77. Springs 78 further have rear tensional arms 80 extending from mounting portions 79 out of slots 76 into biased contact with the facing surfaces of end plates 16 and 18 and also have front tensional arms 80 extending from mounting portions 79 into biased contact with front surfaces 84 that define the inner sides of slots 76 and are substantially parallel to rear walls 74. Torsion springs 78 rotatably bias jaw members 34 and 36 to the capturing position shown in FIGS. 1 and 2.

As shown in FIGS. 1 and 2, a member desired to be gripped, or captured, is shown as elongated male inserting member 86 having an inserting portion 88. In the embodiment of FIGS. 1 and 2, elongated member 86 is shown as cylindrical having an circumferential groove 88 isolating inserting end portion 90, which is adapted to be captured by confronting transverse hollows 92 formed by capturing member 34 and 36 at front walls 72. Hollows 92 isolate transverse lips 94 that extend across front walls 77 and are coextensive with top walls 64. Grooves 88 are adapted to receive lips 94. Elongated member 86 is thus gripped between jaw members 34 and 36 in the capturing position so that it cannot be removed from its insert, or capturing, position. In the capturing position of latching system 10 shown in FIGS. 1 and 2, top portions 68 of jaw members 34 and 36 are equally spaced with bottom portions 70.

In the capturing position, jaw members 34 and 36, as noted above, are being biased at their bottom portions 70 by torsion springs 78, whose arms 80 and 82 are in a compressed mode between end plates 16 and 18 and front surfaces 84 of slots 76, so that the top portions 68 of the jaw members are being rotatably pressed towards one another and towards the positions shown in FIGS. 3 and 4. This rotatable movement of bottom portions 70 is prevented by shaft pins 46, which are positioned in recesses 96 formed in bottom portions 70 of jaw members 34 and 36. Recesses 96 open at bottom walls 66 and side walls 56 and are defined by recess 96 rear surfaces 98, which are parallel to pivots 38 and transverse to the direction of notation of jaw members 34 and 36. An isolated view of jaw member 36 is shown in FIG. 5 viewed from the vantage of FIG. 2 where recess 96 is shown with one of the two pins 46 extending from shaft 46 in locked contact with rear surface 98 of recess 96. FIG. 6 illustrates a frontal view of jaw member 34 in isolation viewed looking at front wall 72. Similarly to FIG. 5, a pin 46 is shown in FIG. 6 extending from shaft 40 into recess 96. As shown in both FIGS. 5 and 6 pin 46 extends proximate to top surface 100 of recess 96 and sets proximate to side surface 102 of recess 96. In the position shown in FIG. 5, bottom portion 70 of jaw member 36 cannot rotate towards bottom portion 70 of jaw member 34, which is likewise immobilized from being rotated towards facing bottom portion 70 of jaw member 36 by locking pin 46. As shown in FIG. 6, it is preferred that pin 46 not be in contact with side surface 102. In this position, expansion spring 48 is no longer biased and shaft 40 has rotated pins 46 to their fullest extents to their to locked positions in recesses 96.

Attention is now directed to FIGS. 3 and 4, where the releasing mode of latching system 10 is illustrated. Here a description will be made of the placement of the movable parts in their releasing mode position along with the operational action that achieves the relasing mode from the capturing mode.

When it is desired to release elongated member 86 from its captured position between jaws 34 and 36, the operator moves lever 42 from its upright position as shown in FIGS. 1 and 2. The lever is pulled away from vertical brace member 54 to which expansion spring 48 is attached thus placing the spring into its biased configuration and simultaneously rotating shaft 40 from its upright position so that pins 46 are likewise rotated from their upright positions as seen in FIGS. 1 and 2 and in FIG. 6 as rotated to one of the pins 46 and jaw member 34 nearest to lever 42. FIGS. 4 and 5 show the position of pins 46 and in particular FIG. 7 shows the position of one pin 46 as related to jaw member 34 after lever 42 has rotated shaft 40 and pins 46 in a direction away from brace member 54. When pins 46 have cleared their abutting positions against rear surfaces 98 of recesses 96 and have passed under bottom walls 66, bottom portions 70 of jaw members 34 and 36 are rotated towards one another from their prior positions by action of torsion springs 78 that were biased in the capturing mode now pressing to unbiased positions. When bottom portions 70 have been rotated sufficiently, recesses 96 pass by pins 46 until bottom walls 66 are adjacent to the pins. When lever 42 is released, biasing action of expansion spring 48 pulls pins 46 into pressing contact with bottom walls 66, as indicated in FIG. 7. At the same time as the rotational movement of bottom portions 70 towards one another, top portions 68 are rotated away from one another, thus freeing elongated member 86 from its capturing position to its releasing position and completing achievement of the releasing mode of latching system 10. In this mode, top portions 72 of jaws 34 and 36 are distantly positioned and bottom portions 70 are proximately positioned, in contrast to the capturing mode where top positions 68 are positioned at an equal distance from one another as one bottom portions 70.

Action of torison springs 78 rotating facing bottom portions 70 towards one another is limited by stop screw 104, which extends from side plate 28 on the same side of shaft 40 as brace member 54 and also which extends inwardly midway between jaw members 34 and 36 and is placed at a selected distance from bottom plate 30 so as to meet the bottom portions 70 at front walls 72 adjacent to recesses 96 at a position designated as stop shoulders 106.

In the positions shown in FIGS. 3, 4, and 7, that is, in the releasing mode, shaft 40 with its pins 46 are in the unlocked position, while jaws 34 and 36 are in the releasing position, which could also be designated as the accepting position ready to receive male inserting end portion 90 of elongated member 86 between jaws 34 and 36 in female cavity 108 formed between the jaw members. When elongated member 86 in fact is inserted into cavity 86, inserting end portion 90 presses front walls 72 of jaw members 34 and 36 apart. When this occurs, recesses 96 are likewise moved apart causing bottom walls 66 to leave pins 46 and to expose the pins to recesses 96 into which they are biased by biased expansion spring 48 via shaft 40 from their unlocked positions into the locked positions as described previously.

Elongated member 86 is described only as an example and various other configurations could be captured by latching system 10. The relative positions of top and bottom portions 68 and 70 in the capturing position, for example, would not have to be aligned from one another at substantially the same distances as described but bottom portions 70 could be nearer or further from one another than top portions 68.

It is to be appreciated that there are numerous other embodiments of the invention which may differ from the disclosed preferred embodiment without departing form the spirit of the invention which is defined in the following claims.

What is claimed is:

1. A latching system comprising, in combination:
   a support structure,
   at least one capturing member supported for movement between capturing and releasing positions by said support member,
   a locking member supported for movement between locked and unlocked positions by said support structure,
   first spring means carried by said capturing member and interrelated with said supporting structure for biasing said capturing member toward said releasing position,
   second spring means interrelated with said locking member and said support structure for biasing said locking to said locked position,
   unlocking means integral with said locking member for enabling movement of said locking member from said locked position to said unlocked position, said latching system further including another capturing member supported for movement between capturing and releasing positions by said supporting member, said another capturing member being mated with and opposed to said one capturing member, and further including another first spring means carried by said another capturing member, said another capturing member being interrelated with said locking member, said second spring means, and said locking means for movement synchranous with said one capturing member, said capturing members being rotatably connected to a pair of substantially parallel cylindrical pivots, said capturing members including top and bottom portions positioned on respective top and bottom opposing sides of said parallel pivots, said top portions being distantly spaced and said bottom portions being approximately spaced in said releasing positions and said top and bottom portions being substantially equally spaced in said capturing positions, wherein said bottom portions of said capturing members include a bottom wall, said capturing members forming recesses in said bottom portions opening at said bottom walls, said recesses being defined in part by rear surfaces transverse to the direction of rotation of said capturing members, and wherein said locking members include a cylindrical bar rotatably mounted on said support structure positioned below said bottom portions of said capturing members and substantially equidistant from said parallel pivots and substantially perpendicular to the direction of said parallel pivots, and two substantially parallel pins connected to and radically extending from said bar, said pins being in biased contact with said bottom walls of said capturing members in said unlocked position and positioned in said recesses with said rear surfaces being in biased contact with said pins in said locked position.

2. The latching system according to claim 1, wherein said capturing members form a pair of bores, said parallel axes being positioned in said bores and said capturing members include front walls disposed in spaced facing relationship and rear walls opposed to said front walls, said capturing members forming a pair of slots substantially perpendicular to said bores and opening onto said rear walls, said slots including front surfaces parallel to said rear walls, said bores and said slots including a coextensive volume, and wherein said first spring means includes a pair of torsion springs positioned in said slots and rotationally mounted with said parallel pivots, one arm of each of said tension springs being in biased contact with said front surfaces and the other arm of each of said tension springs being in biased contact with said support structure, whereby said tension springs rotatably bias said capturing members toward said capturing positions.

3. The latching system according to claim 2, wherein said unlocking means includes a lever radially attached to said bar, said lever being selectively spaced from said capturing members, and wherein said second spring means includes and expansion spring having one end connected to said support structure and the other end connected to said lever, said expansion spring being capable of rotatably biasing said lever and of being biased by movement of said lever, wherein said pair of pins are capable of being biasedly rotated from said unlocked positions to said locked positions in said recesses of said capturing members, whereby said capturing members are prevented from biased rotation towards said capturing position, and whereby said force applied to said lever results in said pins being rotated from said recesses and said capturing members are biasedly rotated toward said releasing positions.

4. The latching system according to claim 3, further including a stop means mounted on said support structure between said capturing members for stopping continuation of biased rotation of said capturing members when said capturing members have been biasedly rotated from said capturing positions to said releasing positions.

5. The latching system according to claim 4, wherein said inserting means includes an inserting portion capable of being releasably held by said capturing members when said inserting portion is positioned between said capturing members and said capturing members are in said capturing position.

* * * * *